US010995906B1

(12) United States Patent
Meheen et al.

(10) Patent No.: US 10,995,906 B1
(45) Date of Patent: May 4, 2021

(54) UNDERGROUND HYDROGEN STORAGE VESSEL

(71) Applicant: Energia de Septiembre LLC, Houston, TX (US)

(72) Inventors: Steven Meheen, San Diego, CA (US); Thomas Howard Shaw, Houston, TX (US)

(73) Assignee: Energia de Septiembre LLC, Houston, TX (US)

( * ) Notice: Subject to any disclaimer, the term of this patent is extended or adjusted under 35 U.S.C. 154(b) by 0 days.

(21) Appl. No.: 16/943,963

(22) Filed: Jul. 30, 2020

(51) Int. Cl.
*F17C 1/00* (2006.01)
*B65G 5/00* (2006.01)

(52) U.S. Cl.
CPC .............. *F17C 1/007* (2013.01); *B65G 5/00* (2013.01); *F17C 2205/0323* (2013.01); *F17C 2205/0352* (2013.01); *F17C 2209/232* (2013.01); *F17C 2221/012* (2013.01); *F17C 2270/0149* (2013.01)

(58) Field of Classification Search
CPC combination set(s) only.
See application file for complete search history.

(56) References Cited

U.S. PATENT DOCUMENTS

| | | | |
|---|---|---|---|
| 3,352,116 A | 11/1967 | Waterman | |
| 4,110,947 A * | 9/1978 | Murray | B65D 88/76 405/54 |
| 4,488,834 A * | 12/1984 | Hooper | B65G 5/00 405/53 |
| 5,207,530 A | 5/1993 | Brooks et al. | |
| 5,333,465 A | 8/1994 | McBride | |
| 6,840,709 B2 | 1/2005 | Dahlem et al. | |
| 8,425,149 B2 * | 4/2013 | Drnevich | C01B 3/48 405/53 |
| 9,109,751 B2 * | 8/2015 | Schimp | F17C 5/06 |
| 9,896,269 B2 * | 2/2018 | Williams | B65G 5/00 |
| 10,221,689 B1 * | 3/2019 | Ellerbusch | E21F 17/16 |
| 2004/0182470 A1 * | 9/2004 | White | F17C 5/00 141/11 |
| 2010/0098492 A1 * | 4/2010 | Dickinson, III | E21B 33/138 405/57 |
| 2011/0274492 A1 | 11/2011 | Verma et al. | |
| 2013/0336721 A1 * | 12/2013 | McBride | E21D 11/00 405/55 |
| 2015/0014186 A1 * | 1/2015 | Wang | F17C 1/02 206/0.6 |
| 2016/0138142 A1 | 5/2016 | Strybos | |

* cited by examiner

*Primary Examiner* — Kyle Armstrong
(74) *Attorney, Agent, or Firm* — Rowan TELS LLC

(57) ABSTRACT

A method of storing hydrogen involves forming an excavation in the earth and constructing a storage tank therein comprised of integrated primary and secondary containment structures. The primary containment structure composed of a plurality of joinable cylindrical segments, or pre-fabricated sections joined to form a cylinder within the excavation. The secondary containment structure formed by pumping a curable, flowable composition into the cylinder, allowing it to flow out the bottom and up the second annulus to the earth's surface, and then hardening; thereby encasing the primary containment structure. The bottom of the cylinder is sealed with the bottom assembly. The top assembly is attached to the cylinder and tubing and packer are run into the cylinder creating a first annulus between the cylinder and tubing. Top assembly is sealed, fluids circulated out, and the tank dried. Thereafter, the tank is capable of safely storing hydrogen gas.

20 Claims, 4 Drawing Sheets

UNDERGROUND HYDROGEN STORAGE VESSEL

BACKGROUND

With the increased use of hydrogen as a non-carbon based fuel there is a present and growing need for gaseous hydrogen storage infrastructure to provide ratable supply of hydrogen on demand to serve the needs of hydrogen production facilities, hydrogen fueling stations, hydrogen fuel cell applications and large volume consumption of hydrogen such as combustion power plants and other thermally intensive industries. However, hydrogen is the smallest molecule and its containment requires special materials and design when stored and transported to address operating, safety and environmental concerns resulting from, but not limited to, hydrogen permeation, absorption, and embrittlement.

Previous attempts to improve on these issues include US 2011/0274492 A1 (Verma et al.), which teaches an underground gaseous storage system using tubes inserted into the subsurface to store hydrogen and other gases. The system described by Verma et al. discusses how each pipe segment utilized to form the assembled tube may be connected by means of welds, screws or chemical seal. However, such combination of connected piping may be prone to leaks from the hydrogen gas. Further, Verma et al. does not teach how the inserted tube (defined as, "a hollow elongated cylinder") can be sealed at the ends to achieve hydrogen containment. Nor does Verma et al. teach how the hollow interior of the tube can be constructed and maintained free of debris and fluids to the specifications required for hydrogen applications.

Another attempt to address the issues of subterranean gas storage can be found in U.S. Pat. No. 5,207,530 A (Brooks et al.), which describes a compressed natural gas storage system. The patent describes a sealed tank buried underground and encased in reinforcing cement. However, the tanks suggested are not suitable for hydrogen gas as they are made of conventional oil field casing, which is vulnerable to hydrogen adsorptions and resulting embrittlement, and the annular casing collars, as illustrated in FIG. 2, have multiple points for seal failure and are unlikely to provide gas-tight connections with respect to hydrogen. It also teaches the bottom end cap having a concave inner surface and an opposing convex outer surface. The bottom cap is attached to the body by an annular ring, with an "O-ring seal" prior to placement in the earth. Furthermore, the patent describes a cementing a reinforcement sheath that surrounds a tank using the puddle cementing method, or injecting cement from surface between the tank and the earth. With the bottom cap installed as described, such a method will be depth-limited because the tank will either float using the puddle method, or the limitation on cement injection between the tank and the earth. Both technical limitations are acknowledged by Brooks et al and, as described in the application, the envisioned depth is 100 feet. Lastly, the top cap is described as having a tapering diameter and being connected to the tank body by an annular collar. As previously noted, the annular collar is a potential seal failure point for hydrogen and tapered cap requires the tank be "held down" during cementing to prevent floating and limits the depth, and therefore the storage volume, of the application.

Another attempt to address the issues of subterranean storage is U.S. Pat. No. 6,840,709 B2 (Dahlem et al.), which describes the use of existing drilled wells (e.g., either dry holes, abandoned or converted producing wells and/or new, to be drilled wells or any other well(s)) for the storage of gases. However, the system and method described are specific to the storage of compressed natural gas and would be unsuitable for the storage of hydrogen gas due to the insufficiency of conventional oil and gas well construction techniques for hydrogen containment. An oil and gas well is designed for extraction of fluids (water, oil and natural gases) from porous and permeable rocks. The casing serves the purpose of preventing collapse of the hole and inflow of formation fluids, and providing structural support for production equipment and surface pressure control equipment. It is not designed for containment of pressurized gases. Second, the cement injected into the space between the outer wall of the casing and the wall of the well is intended to mitigate vertical flow of fluids, rather than containment of pressurized fluids within the well bore, and is not routinely constructed contiguously to surface and, or materials capable of providing additional hydrogen containment. Further, bottom seal is provided by cement and other industry standard plug designs which, like casing, are designed to prevent inflow and not containment of pressurized hydrogen gas. Lastly, common oil field materials are carbon steel, which is susceptible to hydrogen permeation, absorption, and embrittlement which results in structural failure over time.

An early attempt to provide for a steel and pre-stressed concrete underground storage vessel for storage of vapor-phase products (specifically, liquefied petroleum, gas, "LPG") is taught by U.S. Pat. No. 3,352,116 (Waterman 1964) where a shop-constructed, double-walled structure is lowered into a liquid containing shaft with annular space between the inner and out walls containing corrugated reinforcing elements. The vessel is sealed at the lower end so that the vessel is buoyant while being lowered into the shaft. After emplacement the annular space between the vessel and the earth is filled with sand and then grouted with cement to form a continuously trussed beam. This method us unsuitable for storage of hydrogen in the volumes required for the above described application because 1) the buoyancy of the vessel limits the depth of emplacement (the example given is 20 ft diameter and 250 ft. tall), 2) the weld points for the reinforcing elements would create points of weakness susceptible for hydrogen corrosion (permeation, absorption, and embrittlement), 3) the use of a double liner with corrugated metal reinforcing increases the surface area and number of weld points susceptible to hydrogen corrosion, and 4) the floor is described as concrete, which is unsuitable for hydrogen storage.

Another approach is that of US2010/0098492 A1 (Dickinson, III, et al 2010) which describes storing compressed gases, or liquids in unexcavated, permeable rock formations. It teaches that the geological objective for storage can be enhanced by fracturing the rock, or other method by drilling multiple wells, and containment can be established by the injecting an sealant, an impermeable barrier material such as a slurry or cement, into the geologic storage interval to create a containment barrier around the objective storage area. This method is unsuitable for storage of hydrogen due to the uncertainty of containment due to the mobility of the hydrogen molecule being able to migrate through the rock strata, the cost of drilling multiple wells, and the potential for the hydrogen to chemically react with geological materials.

In U.S. Pat. No. 5,333,465 (McBride, 1994) the invention relates generally to storage facilities for natural gas and, more particularly, to underground storage facilities for storing natural gas at vehicular fueling centers dispensing natural gas to natural gas powered vehicles. McBride teaches 1)

a 'conventional water well casing' that may be made of steel or PVC plastic is suitable for the outer containment of a natural gas storage tank, whereas said 'conventional water well casing' is unsuitable for hydrogen storage as it is susceptible to hydrogen permeation, absorption and embrittlement, which induce hydrogen corrosion thereby causing structural failure; 2) PVC plastic pipe that is described as an alternative for the outer containment is typically unsuitable for medium or high pressure applications and is unsuitable for hydrogen containment; 3) a 'conventional' water well wellhead may be utilized, however said water well equipment is unsuitable for the storage of hydrogen as it is susceptible to hydrogen permeation, absorption and embrittlement, which induce hydrogen corrosion thereby causing structural failure; 4) the bottom cap of the 'casing' is described as welded, therefore the casing would have to be installed with the bottom cap in place, which limits cementing, grouting or slurry methods of filling the annulus between casing and the walls of the bore hole to either the puddling method, which will limit the depth of that the storage assembly can be installed due to floating, or injection from the top which is known to provide inconsistent coverage filling, and 5) the internal conduits (tubes) are described as 4.5 inch in diameter and constructed of conventional steel casing materials, which is unsuitable for hydrogen storage as conventional steel casing is susceptible to hydrogen permeation, absorption and embrittlement which induce hydrogen corrosion thereby causing structural failure.

Therefore, a need exists for a safe, effective system and method for containing large volumes of hydrogen gas.

BRIEF SUMMARY

A method of storing hydrogen in a subterranean storage system involves forming an excavation in the earth to a depth suitable to accommodate a storage tank system comprising a primary containment structure and a bottom assembly encased by a secondary containment structure and sealed by a top assembly. The primary containment structure may comprise a conductor pipe, a plurality of joinable cylindrical segments configured to form a cylinder, tubing configured to run inside of the cylinder, a top assembly configured to seal a top of the cylinder, a tail pipe configured to run below the cylinder, and a bottom assembly configured to seal a bottom of the cylinder. The conductor pipe, the cylinder, the tubing, and the tail pipe may be run into the excavation creating a first annulus between the cylinder and the tubing string. A secondary containment structure may be formed by pumping a curable, flowable composition it into the cylinder under pressure, allowing the composition to flow out the unsealed bottom, and into, and filling a second annulus between the cylinder and an excavation face, and allowing the composition to cure. The resulting subterranean storage system is substantially impermeable to hydrogen.

A subterranean hydrogen storage system may include a primary containment structure. The primary containment structure may include a conductor pipe, a plurality of joinable cylindrical segments configured to form a cylinder, a tubing string configured to run inside of the cylinder, a top assembly configured to seal the top of the cylinder, and a bottom assembly configured to seal a bottom of the cylinder. In some configurations tail pipe is run below the cylinder and into the bottom assembly.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
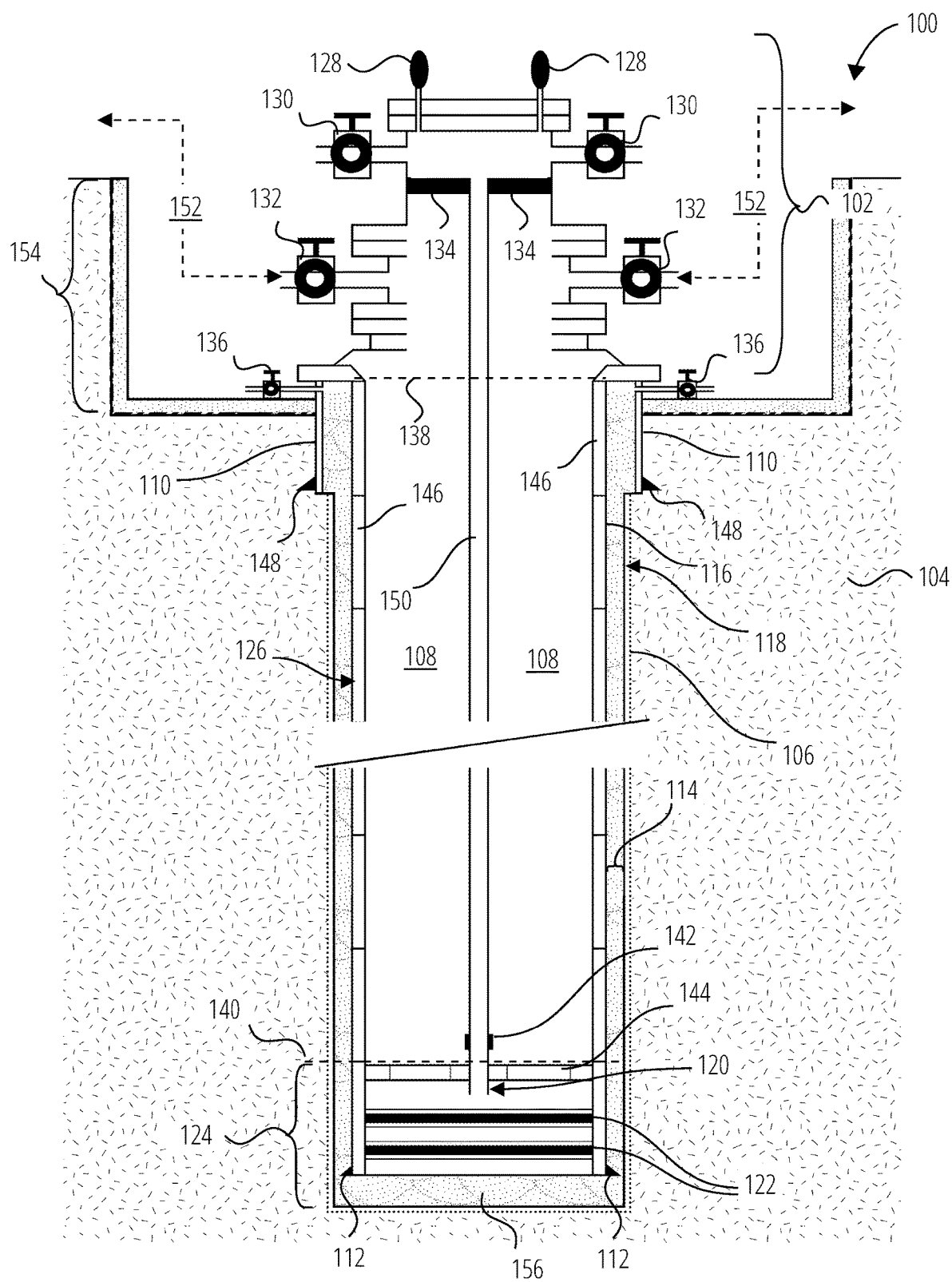
FIG. 1 illustrates a subterranean storage system 100 in accordance with one embodiment.

A subterranean storage system with multiple barriers to gaseous flow is described for use with storing hydrogen, or other gases under pressure. The subterranean storage system includes a multi-barrier containment system provided by a cylindrical tank, one or more impermeable material encasements, and the earth. The subterranean storage system may be constructed by joinable cylinders, joined together by threaded connections or other means, connected above the ground, and then emplacing them in excavated hole formed by rotary drilling, augering or other means in the earth. The connected cylinder is then encased for secondary containment and may then be sealed on each end forming a cylindrical tank. Additional containment may be provided by coating the interior and/or exterior of the primary containment structure (tank) and, or emplacing one or more additional cylinders, of smaller diameter, within the primary containment structure.

The primary containment structure may be constructed of a steel or metallic alloy with specific tolerances suitable for the storage of hydrogen, as hydrogen storage requires specialized materials. Ordinary pipe and conventional oilfield casing may be not suitable materials. In some configurations, the joinable cylinder segments utilized may be commonly manufactured pipe used in pipelines or industrial applications. The materials utilized for the joinable cylinder segments that form the cylinder may be steel, alloys (ferrous and/or nonferrous), composite materials, fiberglass, or reinforced plastic (FRP) that in some embodiments may be wound with carbon fiber or other such supporting materials. The cylindrical segments, components, and apparatus of the containment system may be coated on the interior and/or exterior with coatings that reduce hydrogen permeation or embrittlement, corrosion, or any material degradation in regard to the materials utilized.

The primary containment structure may be encapsulated with a curable slurry, suspension, and/or cement, that when hardened may increase the structural integrity of the cylinder and, or further inhibit hydrogen permeation, and thereby form a secondary containment structure.

The secondary containment structure is formed by pumping a curable slurry, suspension, and/or cement into the cylinder cavity and allowed to flow out the unsealed bottom into the annulus formed between the primary containment structure and the earth, and circulated to surface. The slurry, suspension, and/or cement application may be uniform, completely filling the area between the outermost pipe of the next barrier of containment or the earth. After curing, the bottom of the cylindrical tank may then be sealed with the bottom assembly. The top of the cylindrical tank may then be sealed with a top assembly. The integration of the primary containment structure and the encasement in a secondary containment structure provides for a safe and economical hydrogen storage system.

"Slurry" refers to a mixture of suspended solids and liquids. Muds in general are slurries but are seldom called that. The materials utilized may be high strength cement, now manufactured with strengths in excess of 25,000 psi, and comprising glass fiber or other strength additives. Additionally, polymers, or other additives may be added to the cement to reduce gas permeation. This pumped slurry, suspension, and/or cement encases the cylindrical tank and forms a secondary layer between the cylindrical tank and the excavation face after it is cured. The secondary layer may also provide structural support. Additionally, this process may be repeated by adding additional containment layers. The resulting subterranean storage system is substantially impermeable to hydrogen. The term "substantially impermeable" as used herein and in the claims, includes preventing or at least controlling permeation such that the hydrogen can be stored without permeating or leaking more hydrogen than is allowed for by safety or environmental laws, or practices.

The bottom of the cylinder may then be sealed by setting a plug and, after curing, setting a packer or a packer-type device constructed of materials suitable for use with hydrogen above the plug. "Plug" refers to a volume of slurry, suspension, and/or cement or similar material placed in a specific location within the excavation or cylinder and which is allowed to set, or cure to provide a means of pressure isolation or a mechanical platform. For correct placement, the volume of slurry and the displacement fluid can be should be carefully calculated and measured. The correct volumes ensure that the column of fluid in the tubing is balanced by the column of fluid in the annulus, and that the plug is placed in the correct location.

"Packer" refers to a device that can be run into a cylinder with a smaller initial outside diameter that then expands externally to seal the cylinder. Packers employ flexible, elastomeric elements that expand. The two most common forms are the production or test packer, and the inflatable packer. The expansion of the former may be accomplished by squeezing the elastomeric elements (somewhat doughnut shaped) between two plates, forcing the sides to bulge outward to form a gas tight seal against a surface. The expansion of the latter is accomplished by pumping a fluid into a bladder, in much the same fashion as a balloon, but having more robust construction. The bladder expands to form a gas tight seal against a surface. Production or test packers may be set in cylinders and inflatable packers are used in cylinders or excavations formed by rotary drilling or augering. Packers may be run on wireline, pipe, or coiled tubing. Some packers are designed to be removable, while others are permanent. Permanent packers are constructed of materials that are easy to drill or mill out. Typically, such packer devices may be cam-actuated by a running tool, which when actuated causes the packer to form a gas tight seal on the inner circumference of the cylinder providing an impervious barrier. In one configuration, one or more packers may be set above the plug or other fixture at the base of the cylinder to seal the bottom of the primary containment cylinder and form the bottom of the tank. In some embodiments, two, or more packers may be utilized for redundancy in the bottom assembly as may be provided part of best practices.

The top of the cylinder may then be sealed by setting a packer-type device, orifice plate, or combination thereof constructed of materials suitable for use with hydrogen within the top assembly. Some embodiments may utilize multiple packers, orifice plates, or combinations thereof to assure redundancy in the upper containment barrier. The upper sealing packer, orifice plates, or combinations thereof may have one or more tubing penetrations for injecting and withdrawing hydrogen and/or cleaning fluids, or gases, and for monitoring pressure within the tank.

In several embodiments, the top of the cylinder may be sealed with the exception of access port(s) any fluids within the cylinder may then be circulated out and replaced with filtered, demineralized water. The demineralized water may be filtered to a set requirement of approximately a 1-micron standard but is not limited thereto. The water may then be compressed to the test pressure of the containment apparatus, and the containment integrity verified.

Once containment integrity is verified, the water is displaced, and the tank is dried using gaseous dry nitrogen, or other gas. After the tank is clean and dry, then hydrogen injection may commence, and hydrogen may be withdrawn or injected into the containment apparatus as needed.

The storage tank may have a service, cleaning port with smaller diameter piping extending as far as the bottom of the storage tank so that the tank may be cleaned periodically after it is assembled utilizing filtered demineralized water circulated through the cylindrical tank. Once the demineralized water has been circulated within the storage tank, the interior of the tank system may be dried by means of circulating dry nitrogen, or other such inert gas. Such a cleaning port and related piping are not shown in FIG. 1, 2, or 3.

The cylinder may be made configured with a 'pipe in pipe' design where a smaller diameter cylinder is encased within a larger cylinder, which may provide an additional containment barrier of the tank system. The interior cylinder may be may be of continuous construction, such as coil tubing, or made of joinable cylinder segments, joined by means of threaded, or welded connections, wedge or bayonet-type connections, or other methods forming a hydrogen gas tight seal between the cylinder segments. The connections between the cylinder segments may contain sealing methods such as metal to metal, O-ring, or other such mechanical seals.

The subterranean storage system utilizing a 'pipe in pipe' configuration for the cylinder segments may have a vent or exit port such that gases passing through the first layer of containment may be vented and/or extracted from an annulus area in between the two tubular tank containment walls. In some configurations, the annulus area between the outer wall of the inner pipe and the inner wall of the outer pipe may be filled with a pressurized inert gas. In some configurations, the annulus area between the outer wall of the inner pipe and the inner wall of the outer pipe may be filled with a slurry, suspension, and/or cement and allowed to cure. Additionally, the annulus area between the outer wall of the inner pipe and the inner wall of the outer pipe may contain sensors for monitoring pressure, temperature, stresses and, or other aspects of hydrogen containment.

The subterranean storage system utilizing a 'pipe in pipe' configuration may have access ports into the storage tank may be installed for the filling/depletion of the tank, as well as for instrumentation.

The bottom most cylinder section of the interior cylinder assembly may have a flange, plug, 'shoe', or other fixture so as to provide a gas tight 'end piece' to the tertiary containment structure. "Shoe" refers to a short assembly with a rounded profile that is screwed or otherwise integrally attached to the bottom of the interior cylinder assembly. The rounded profile helps guide the interior pipe assembly past any constrictions in the primary containment cylinder, and ensure it is correctly located with the primary containment cylinder.

One or more packer devices or plugs, or combination thereof may be used above the bottom shoe, plug or other fixture that may be utilized at the bottom of the tank and within the bottom of the interior cylinder to form an impervious barrier with a gas tight seal on the inner circumference of the interior cylinder. Such packers and, or plugs shall be constructed of materials suitable for use with hydrogen.

The excavation for the subterranean storage system may be constructed by means of rotary drilling, augering, caisson excavation, pile driving, and/or combinations thereof. The diameter of the excavation may be developed by consideration of the amount of gaseous substance to be stored, material properties of the cylindrical tank and the thickness, and materials used for secondary containment. Depth of the subterranean storage system for the storage tank may vary considering local geological conditions, storage volume requirements, engineering or other site or case specific matters.

The storage tank system may include ports to charge and discharge contents, typically inlet and outlet ports of an appropriately sized pipe at the earth's surface with control valves. The inlet/outlet ports may be attached to a manifold and, or distribution system.

Multiple subterranean storage systems may be joined together into a system by means of a manifold or piping arrangement which allows them to be used in conjunction with one another.

The containment system may include sensors embedded for monitoring various parameters such as pressure, temperature, contamination, hydrogen permeability in the containment system, and other such parameters. Sensors may be embedded or installed within the containment cylinder, secondary containment zone, the earth, or in the earth near the subterranean containment system for monitoring purposes, including inventory, pressure, temperature and/or containment integrity.

Gases stored may be stored under high, medium or low pressure. The maximum allowable pressure is determined by the burst strength of the primary containment system with an appropriate safety factor. The cylinder may be pressure tested after construction so as to verify pressure retaining integrity and may be pressure tested periodically thereafter as may be required by regulation and, or practice.

FIG. 1 illustrates a subterranean storage system 100 in accordance with one embodiment. The subterranean storage system 100 is positioned within an excavation that has been made into the earth 104. The subterranean storage system 100 can be utilized for the storage of hydrogen gas. The subterranean storage system 100 comprises a primary containment structure 126 and a secondary containment structure 118. The integrated combination of the primary containment structure 126 and the secondary containment structure 118, and other containment barriers as may be added, form a tank for the storage of hydrogen, or other gases.

The primary containment structure 126 and the secondary containment structure 118 are found within the excavation with the secondary containment structure 118 positioned between the primary containment structure 126 and the excavation face 106. The excavation is formed by a process that includes at least one of rotary drilling, augering, pile excavation, caisson excavation and/or combinations thereof.

The primary containment structure 126 comprises a top assembly 102, a cylinder 116, a tubing string 150, a conductor pipe 110, a tail pipe 120, and a bottom assembly 124. The conductor pipe 110, the cylinder 116, the tubing string 150, and tail pipe 120 are run into the excavation, creating a first annulus 108 between the cylinder 116 and the tubing string 150. "Conductor pipe" refers to large diameter pipe, shorter in length than the cylinder, that is usually put into the excavation first, to act as a foundation for the primary excavation, and to prevent the sides of the excavation face 106 from caving into the excavation. Conductor pipe is run because the shallow section of most excavations is unconsolidated sediment or soil rather than consolidated strata typically encountered deeper. The conductor pipe 110 is typically installed below the top assembly 102, contains the cylinder 116 and is operatively coupled to at least one conductor bleed valve 136. Its primary role is structural support for the excavation, but it may also be configured to provide an additional containment barrier. In some configurations, the conductor pipe 110 includes a set of conductor shoes 148 positioned on the outside of the conductor pipe 110 and below the top assembly 102 and attached to the secondary containment structure 118. The primary containment structure 126 foundation may also include a cellar 154, which is a dug-out area, typically lined with cement or a large thin-wall pipe. The conductor pipe may be driven into the ground and if so, called a "drive pipe." In some configurations, the conductor pipe 110 may be batch rotary drilled, augered, or driven for all storage tanks on the location with equipment fit for purpose.

The cylinder 116 may be formed from a plurality of joinable cylindrical segments 146, or a plurality of prefabricated sections that are joined together to achieve the desired the length of the primary containment structure 126. The plurality of joinable cylindrical segments, or prefabricated tank segments may comprise at least one of a threaded connection, bayonet connectors, wedge connectors, flanged connectors and connectors with collars, and combinations thereof to connect the segments together. The cylinder 116 may also include cylinder shoe 112 on its exterior at the base of the cylinder. In some configurations, the cylinder 116 may be coated with epoxy, resin, or other suitable material on its interior, exterior, or both to prevent hydrogen permeation. The plurality of joinable cylindrical segments can include 20" diameter or larger cylinder segments, but is not limited in diameter as it is engineered specific to each application to maximize volume and structural strength. The actual size used for the plurality of joinable cylindrical segments is determined by desired storage volume, materials being used, available installation equipment, and site conditions. The diameter of cylinder segment sizes that can be used are 60", 48", 36", 24", 20", 18¾", 16", 14", 12", 10.5", 9.675" etc., and is not limited thereto.

The cylinder 116 can also be prefabricated offsite, whereby it is installed within the excavation as a completed or nearly completed assembly. A cylinder prefabricated offsite could have a diameter in excess of 8 feet, but is not limited thereto, the diameter being determined by volumetric storage needs, nature of materials used, available installation equipment and/or site conditions.

The secondary containment structure 118 is formed as a layer surrounding and, or encasing the primary containment structure 126 such that the secondary containment structure 118 is positioned between the earth 104 and the cylinder 116, the earth 104 and the bottom assembly 124, and below the top assembly 102, The secondary containment structure 118 is typically formed by filling a second annulus 114 between the cylinder 116 and an excavation face 106 with a flowable composition 156, such as a slurry, suspension, or cement. In one embodiment, the flowable composition 156 is pumped into the cylinder 116, and is allowed to circulate out the unsealed bottom of the cylinder and flow up into, and filling, the second annulus to the earth's surface.

The top assembly 102 seals the top of the cylinder 116 (top 138) and provides for input and withdrawal of hydrogen. The top assembly 102 may include valves, flanges, ports, and sensors, but is not limited thereto, and typically configured with different valve arrangements as requested or required by an owner/operator and/or regulatory requirements. The top assembly 102 shall include at least one first annulus outlet valve 132 and/or at least one tubing string service valve 130. The first annulus outlet valve 132 is operatively disposed towards the first annulus 108. The tubing string service valve 130 is coupled to the tubing string 150. A top manifold 152 is typically be attached to at least one first annulus outlet valve 132.

The tubing string 150 may include a plurality of plugs 134, packers, orifices plates, or combination thereof within the top assembly 102 that may be function to seal pressure from below. A gauge holder 142 may be installed on the tubing string 150 above the bottom assembly 124 for determining the temperature and pressure at the bottom of the cylinder 116. The tubing string gauges 128 may be coupled to the tubing string 150. The tubing string 150 uses include but are not limited to tank cleaning, maintenance services, monitoring tank conditions, and/or instrumentation.

"Tail pipe" refers to tubulars and completion components run below a packer set 144. The tail pipe 120 runs below the cylinder 116 and may be the portion of the tubing string 150 found within the bottom assembly 124. The tail pipe is included in a completion design to provide a facility for installing and monitoring the performance plugs and/or other temporary flow-control devices within the bottom assembly, improve downhole hydraulic characteristics, and provide a suspension point for downhole gauges and monitoring equipment.

The bottom assembly 124 seals the bottom of the cylinder 116 (bottom 140). The bottom assembly 124 is positioned below the cylinder 116 and comprises at least one of a flange, a plug 122, a cylinder shoe 112, and combinations thereof. The tail pipe 120 can be positioned adjacent to or within the bottom assembly 124. In some configurations, the plug 122 may be cured and have at least one packer set 144 above the plug 122.

In some instances, the cylinder 116 may be cleaned and tested after the second annulus 114 is filled and the suspension allowed to cure, and the top assembly 102 and bottom assembly 124 are in place. The cylinder 116 may be cleaned by adding water and circulate construction fluids out of the cylinder 116, and sealing the top of the cylinder 116. The water is then compressed to test the pressure of the storage system tank, thereby assessing a containment integrity of the storage tank system.

Prior to the installation of the subterranean storage system a geological survey may be performed to determine storage tank design and to confirm the absence of hydrocarbon-bearing, geological traps, and/or identify excavation hazards.

Figure 2:
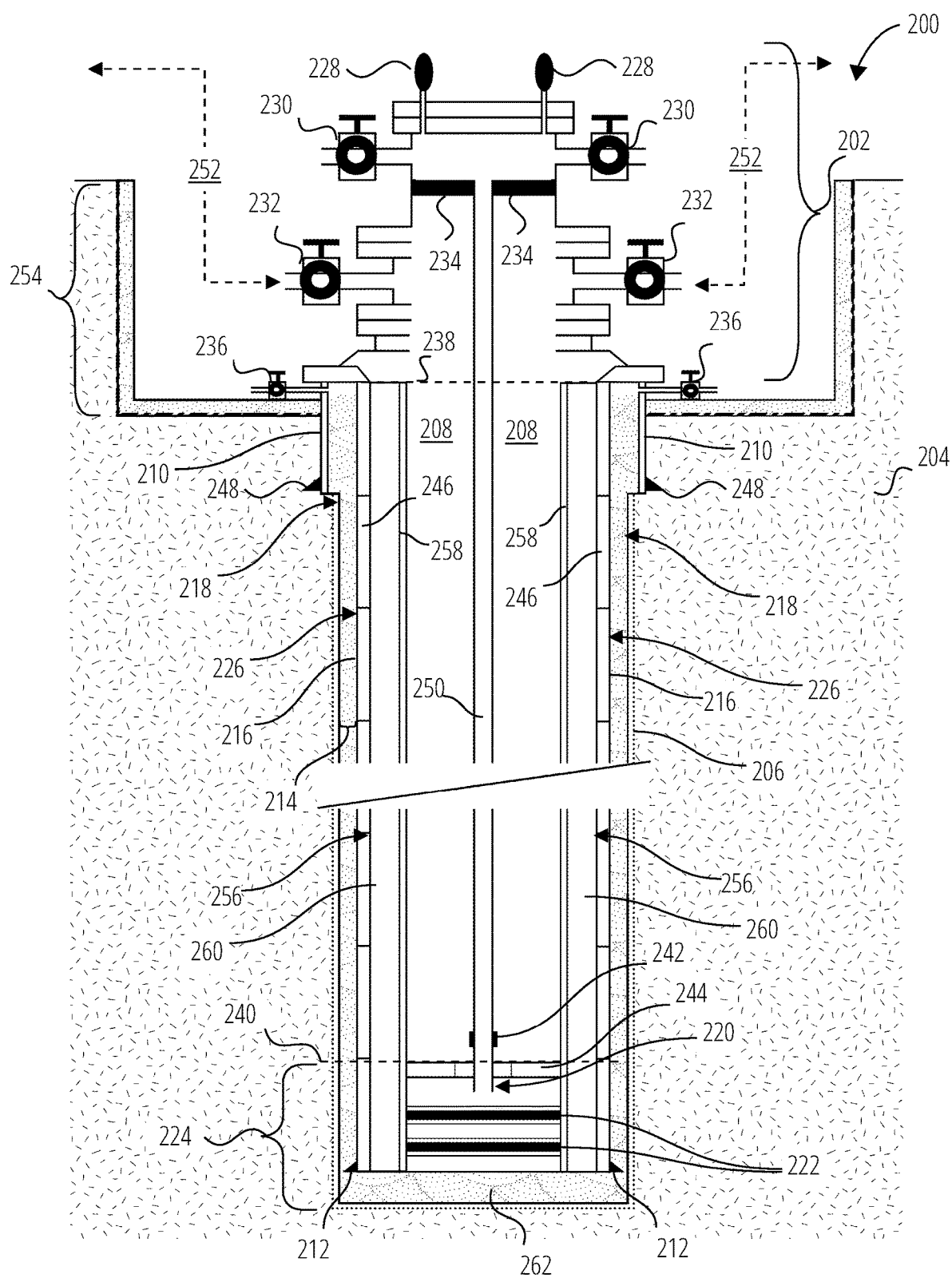
FIG. 2 illustrates a subterranean storage system 200 in accordance with one embodiment.

FIG. 2 illustrates a subterranean storage system 200 in accordance with one embodiment. The subterranean storage system 200 is a triple containment structure configuration for a subterranean storage system within the earth 204. The subterranean storage system 200 can be utilized for the storage of hydrogen gas. The subterranean storage system 200 comprises a primary containment structure 226, a secondary containment structure 218, and a tertiary containment structure 256 positioned within the earth 204.

The primary containment structure 226 comprises a top assembly 202, a cylinder 216, a tubing string 250, a conductor pipe 210, a tail pipe 220, and a bottom assembly 224. The cylinder 216, the tubing string 250, and tail pipe 220 are run into the excavation creating a first annulus 208 between the cylinder 216 and the tubing string 250.

The conductor pipe 210 refers to a large diameter pipe, shorter in length than the cylindrical tank, that is usually put into the excavation first, to act as a foundation for the top assembly 202 and to prevent the sides of the excavation face 206 from caving into the excavation. Conductor pipe 210 is run because the shallow section of most excavations is in unconsolidated sediment or soil rather than consolidated strata typically encountered deeper. The conductor pipe 210 is typically installed below the top assembly 202 and contains the uppermost cylinder 216. The conductor pipe is primarily to provide structural support, but it may be configured to provide an additional containment barrier. In some configurations, the conductor pipe 210 is below the top assembly 202 and contains, and may be connected to the secondary containment structure 218. The conductor pipe 210 is operatively coupled to at least one conductor bleed valve 236. The conductor pipe may include a set of conductor shoes 248 positioned on the outside of the conductor pipe 210. The primary containment structure 226 foundation may also include a cellar 254, which is a dug-out area, typically lined with cement or a large thin-wall pipe. The conductor pipe may be driven into the ground and if so, called a "drive pipe". In some configurations, the conductor pipe 210 may be batch augered, drilled, driven, or some combination thereof for all storage tanks on the location with equipment fit for purpose.

The cylinder 216 may be formed from a plurality of joinable cylindrical segments 246, or a plurality of prefabricated tanks sections that are joined together to the length of the cylinder 216. The plurality of joinable cylindrical segments comprise at least one of a threaded connection, bayonet connectors, wedge connectors, flanged connectors and connectors with collars, and combinations thereof to connect the segments together. The cylinder 216 may also include cylinder shoe 212 on its exterior at the base of the cylinder. In some configurations, the cylinder 216 may be coated on its interior, exterior, or both with epoxy, resin, or other suitable material to prevent hydrogen permeation. The actual size used for the plurality of joinable cylindrical segments is determined by desired storage volume, materials being used, available installation equipment, and site conditions. The diameter of cylinder segment sizes that can be used are 60", 48", 36", 24", 20", 18¾", 16", 14", 12", 10.5", 9.675" etc., and is not limited thereto.

The cylinder 216 can also be prefabricated offsite, whereby it is installed within the excavation as a completed or nearly completed assembly. A cylinder prefabricated offsite could have a diameter in excess of 8 feet, but is not limited thereto, the diameter being determined by volumetric storage needs, nature of materials used, available installation equipment and/or site conditions.

The secondary containment structure 218 surrounds the cylinder 216 and the bottom assembly 224 and is positioned between the primary containment structure 226 and the excavation face 206. The secondary containment structure 218 is formed when a second annulus 214, found between the primary containment structure 226 and the excavation face 206, is filled with a flowable composition 262 that is curable, such as a slurry, a suspension, cement, or other curable substance that is then allowed to harden. In one embodiment, the flowable composition 262 is pumped into the cylinder 216, and is allowed to circulate out the unsealed bottom of the cylinder, and up into and filling the second annulus to the earth's surface.

The top assembly 202 seals the top of the cylinder 216 (top 238) and provides for input and withdrawal of hydrogen. The top assembly 202 may include valves, flanges, ports, and sensors, but is not limited thereto, and typically configured with different valve arrangements as requested or required by an owner/operator and/or regulatory requirements. The top assembly 202 shall include at least one first annulus outlet valve 232 and, or at least one tubing string service valve 230. The first annulus outlet valve 232 is operatively disposed towards the first annulus 208. The tubing string service valve 230 is coupled to the tubing string 250. A top manifold 252 is typically be attached to at least one first annulus outlet valve 232.

The tubing string 250 may include plugs 234, packer, orifice plate, or combination thereof within the top assembly 202 that may be function to seal pressure from below. A gauge holder 242 may be installed on the tubing string 250 above the bottom assembly 224 for measuring the temperature, pressure, and, or other conditions at the bottom of the cylinder 216. The tubing string gauges 228 may be coupled to the tubing string 250. The tubing string 250 uses include but are not limited to tank cleaning, maintenance services, monitoring tank conditions, and/or instrumentation.

"Tail pipe" refers to tubulars and completion components run below a packer (packer set 244). The tail pipe 220 runs below the cylinder 216 and may be the portion of the tubing string 250 found within the bottom assembly 224. The tail pipe is included in a completion design to provide a facility for installing and monitoring the performance of plugs and other temporary flow-control devices within the bottom assembly, improve downhole hydraulic characteristics, and provide a suspension point for downhole gauges and monitoring equipment.

The bottom assembly 224 seals the bottom of the cylinder 216 (bottom 240). The bottom assembly 224 is positioned within the cylinder 216 and comprises at least one of, a flange, a plug 222, one or more packer sets 244 and combinations thereof, and a tail pipe 220. The tail pipe 220 can be positioned adjacent to or within the bottom assembly 224. In some configurations, the plug 222 may be cured and have at least one packer set 244 above the plug 222.

In some instances, the cylinder 216 may be cleaned and tested after the second annulus 214 is filled and the suspension allowed to cure, with the top assembly 202 in place. The cylinder 216 may be cleaned by adding water, then circulating fluids out of the cylinder 216, and testing can be performed by then compressing the water to a predetermined pressure so as to pressure test the primary containment system, thereby assessing and confirming containment integrity of the storage tank system.

The tertiary containment structure 256 may include at least one of a pipe-in-pipe liner (tertiary containment layer 258) to prevent hydrogen permeation from the first annulus 208. The tertiary containment structure 256 may be of continuous construction, such as coil tubing, or composed a plurality of joinable cylindrical segments joined together by at least one of a threaded connection, bayonet connectors, wedge connectors, flanged connectors and connectors with collars, and combinations thereof to connect the segments together. The liner within the primary containment structure 226 creates a third annulus 260, between the inner wall of the primary containment structure 226 and the pipe-in-pipe liner, and may be filled with the flowable, curable composition, suspension or cement to provide an additional containment barrier. In another embodiment, the third annulus 260 is left open and coupled to an annular valve (not shown) in the top assembly 202 in order to allow monitoring of the liner integrity and reduce contact of hydrogen with the internal surface of the primary containment structure 226. In another embodiment, the third annulus 260 is flooded with nitrogen or another inert gas injected thru the annular valve in the top assembly to inhibit the permeation of hydrogen and allow for monitoring the liner pressure integrity of the third annular space.

In some instances, the tertiary containment structure 256 may be cleaned and tested after the tertiary containment structure 256, top assembly 202, and bottom assembly are in place. The tertiary containment structure 256 may be cleaned by adding water, circulating fluids out of the cylinder 216, and sealing the top of the cylinder 216. The water is then compressed to test the pressure of the storage system tank, thereby assessing a containment integrity of the storage system tank.

Figure 3:
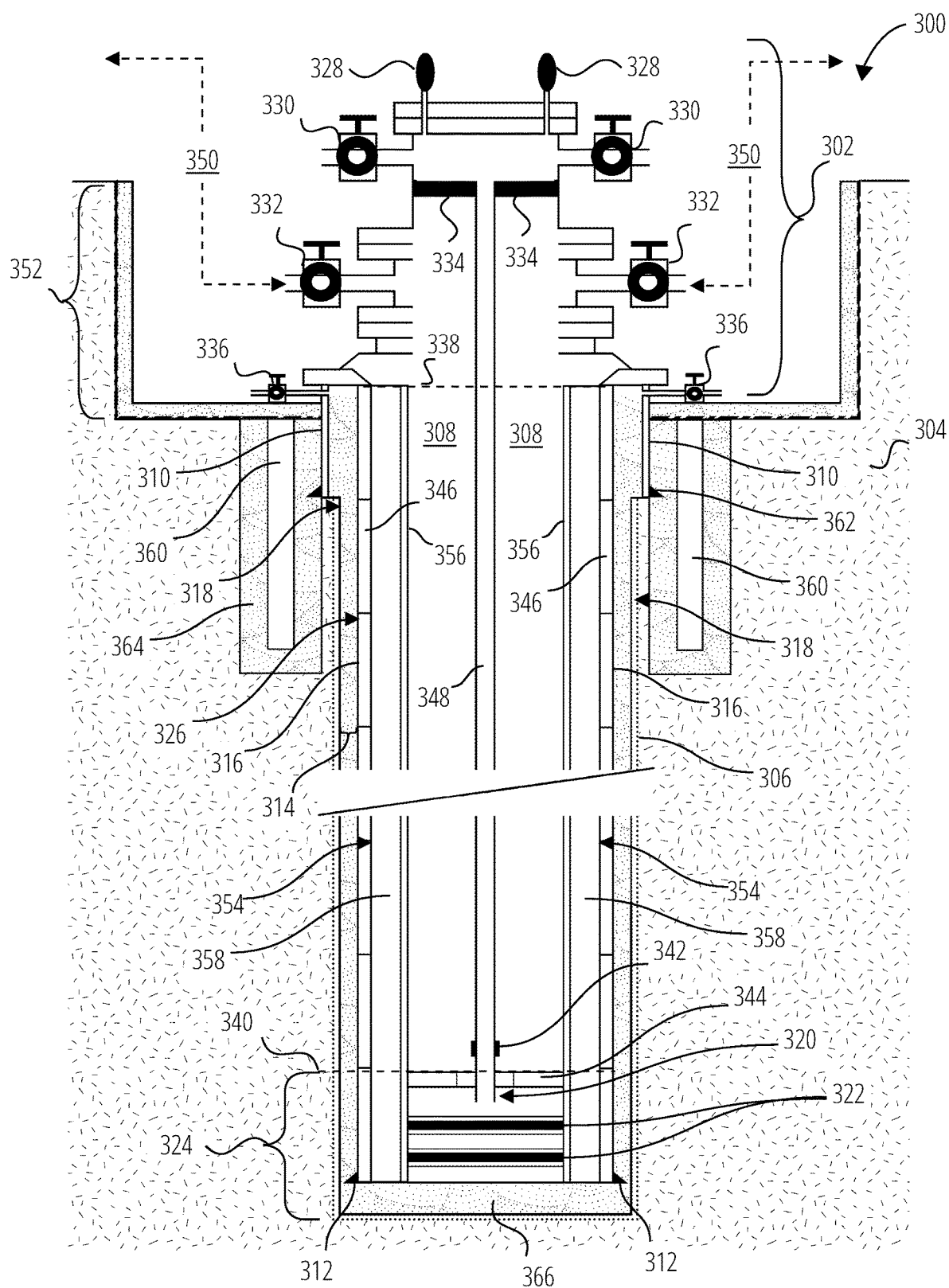
FIG. 3 illustrates a subterranean storage system 300 in accordance with one embodiment.

FIG. 3 illustrates a subterranean storage system 300 in accordance with one embodiment. The subterranean storage system 300 is a tertiary containment structure configuration of a subterranean storage system with a foundation support structure 360. The subterranean storage system 300 comprises a primary containment structure 326, a secondary containment structure 318, a tertiary containment structure 354, and a foundation support structure 360 found within the earth 304. The primary containment structure 326 comprises a top assembly 302, a cylinder 316, a tubing string 348, and a conductor pipe 310. The conductor pipe 310, the cylinder 316, the tubing string 348, and tail pipe 320 are run into the excavation, creating a first annulus 308 between the cylinder 316 and the tubing string 348.

The conductor pipe 310 refers to a large diameter pipe, shorter in length than the cylindrical tank, that is usually put into the excavation first to act as a foundation for the top assembly 302 and to prevent the sides of the excavation face 306 from caving into the excavation. Conductor pipe 310 is run because the shallow section of in the excavation is usually unconsolidated sediment or soil rather than consolidated strata typically encountered deeper. The conductor pipe 310 is typically installed below the top assembly 302 and contains the uppermost cylinder 316. The conductor pipe is primarily a structural element but may be configured to provide an additional containment barrier. In some configurations, the conductor pipe 310 includes a set of conductor shoes 362 positioned on the outside of the conductor pipe 310. The conductor pipe 310 is operatively coupled to at least one conductor bleed valve 336. The primary containment structure 326 foundation may also include a cellar 352, which is a dug-out area, typically lined with cement or a large thin-wall pipe. The conductor pipe may be driven into the ground and if so, called a "drive pipe". In some configurations, the conductor pipe 310 may be batch augered, drilled, driven, or some combination thereof for all storage tanks on the location with equipment fit for purpose.

The cylinder 316 may be formed from a plurality of joinable cylindrical segments 346, or a plurality of prefabricated tank sections that are joined together to the length of the cylinder 316. The plurality of joinable cylindrical segments, or prefabricated tank segments may comprise at least one of a threaded connection, bayonet connectors, wedge connectors, flanged connections and connectors with collars, and combinations thereof to connect the segments together. The cylinder 316 may also include cylinder shoe 312 on its exterior at the base of the cylinder. In some configurations, the cylinder 316 may be coated on its interior, exterior, or both with epoxy, resin, or other suitable material to prevent hydrogen permeation. The actual size used for the plurality of joinable cylindrical segments is determined by desired storage volume, materials being used, available installation equipment, and site conditions. The diameter of cylinder segment sizes that can be used are 60", 48", 36", 24", 20", 18¾", 16", 14", 12", 10.5", 9.675" etc., and is not limited thereto.

The cylinder 316 can also be prefabricated offsite, whereby it is installed within the excavation as a completed or nearly completed cylinder assembly. A cylinder prefabricated offsite could have a diameter in excess of 8 feet, but is not limited thereto, the diameter being determined by desired storage volume, materials being used, available installation equipment, and site conditions The secondary containment structure 318 surrounds and encases the cylinder 316 and the bottom assembly 324, and is positioned between the primary containment structure 326 and the excavation face 306. The secondary containment structure 318 is formed when a second annulus 314, found between the primary containment structure 326 and the excavation face 306, is filled with a flowable composition 366 that is curable, such as a slurry, a suspension, cement, or other curable substance, that is then allowed to harden. In one embodiment, the flowable composition 366 is pumped into the cylinder 316 under pressure and is allowed to circulate out the unsealed bottom of the cylinder, and up into and filling the second annulus to the surface of the earth.

The top assembly 302 seals the top of the cylinder 316 (top 338) and provides for input and withdrawal of hydrogen. The top assembly 302 may include valves, flanges, ports, and sensors, but is not limited thereto, and typically configured with different valve arrangements as requested or required by an owner/operator and/or regulatory requirements. The top assembly 302 shall include at least one first annulus outlet valve 332 and, or at least one tubing string service valve 330. The first annulus outlet valve 332 is operatively disposed towards the first annulus 308. The tubing string service valve 330 is coupled to the tubing string 348. A top manifold 350 is typically be attached to at least one first annulus outlet valve 332.

The tubing string 348 may include a plug 334, packer and, or orifice plate, or combinations thereof, within the top assembly 302 that may function to seal pressure from below. A gauge holder 342 may be installed on the tubing string 348 above the bottom assembly 324 for measuring temperature, pressure and other conditions at the bottom of the cylinder 316. Tubing string gauges 328 may be coupled to the tubing string 348. The tubing string 348 uses include but are not limited to tank cleaning, maintenance services, monitoring tank conditions, and/or instrumentation.

"Tail pipe" refers to tubulars and completion components run below a packer (packer set 344). The tail pipe 320 runs below the cylinder 316 and may be that portion of the tubing string 348 found within the bottom assembly 324. The tail pipe is included in a completion design to provide a facility for installing or monitoring the performance plugs and other temporary flow-control devices, improve downhole hydraulic characteristics, and provide a suspension point for downhole gauges and monitoring equipment.

In some instances, the tertiary containment structure 354 may be cleaned and tested after the second annulus 314 is filled and the suspension allowed to cure and the top assembly 302 temporarily installed. The tertiary containment structure 354 may be cleaned by adding water, circulating fluids out of the cylinder 316, and sealing the top of the cylinder 316. The water is then compressed to test the pressure of the secondary containment structure.

The tertiary containment structure 354 may include at least one of a pipe-in-pipe liner (tertiary containment layer 356), The tertiary containment structure 354 may be of continuous construction, such as coil tubing, or composed a plurality of joinable cylindrical segments joined together by at least one of a threaded connection, bayonet connectors, wedge connectors, flanged connectors and connectors with collars, and combinations thereof to connect the segments together. In some configurations, tertiary containment structure 354 may be coated on its interior, exterior, or both with epoxy, resin, and/or other suitable material to prevent hydrogen permeation. The tertiary containment structure 354 within the primary containment structure creates a third annulus 358, between the inner wall of the primary containment structure 326 and the pipe-in-pipe liner. In one embodiment the third annulus 358 is filled with the flowable, curable composition, suspension or cement and allowed to harden to provide additional containment barrier. In another embodiment, the third annulus 358 is left open and coupled to a third annulus valve (not shown) in the top assembly 302 in order to allow monitoring of the liner integrity and reduce contact of hydrogen with the internal surface of the primary containment structure 326. In another embodiment the nitrogen, or other inert gas, is injected thru the third annulus valve (not shown) in the top assembly 302 to flood the third annulus in order to monitor the liner (tertiary containment layer 356) and primary containment structure 326 integrity.

The bottom assembly 324 comprises a tail pipe 320, one or more packer sets 344, one or more plugs 322 and, or combinations thereof. The bottom assembly 324 seals the bottom of the tertiary containment structure 354 (bottom 340). The tail pipe 320 can be positioned adjacent to or within the bottom assembly 324. In some configurations, the plug 322 may be cured and have at least one packer set 344 above the plug 322.

The tertiary containment layer 356 may be cleaned by adding water, circulating fluids out of the cylinder 316, and sealing the top of the cylinder 316. The water is then compressed to test the pressure of the storage system tank, thereby assessing the containment integrity of the storage tank system.

In an embodiment, the foundation support structure 360 is positioned in the earth 304 outside the conductor pipe 310 and below to the top assembly 302 and may be integrally coupled to the top assembly 302 and, or cellar 352 to provide additional support for the subterranean storage system 300 within the earth 304. Such a foundation may include, but is not limited to poured, driven, or constructed pilings, caisson, or sill. Such foundation may be reinforced with other structural materials, like wire mesh or metal bars, to increase its structural strength. The foundation support structure 360 may also include a supporting substructure 364.

Figure 4:
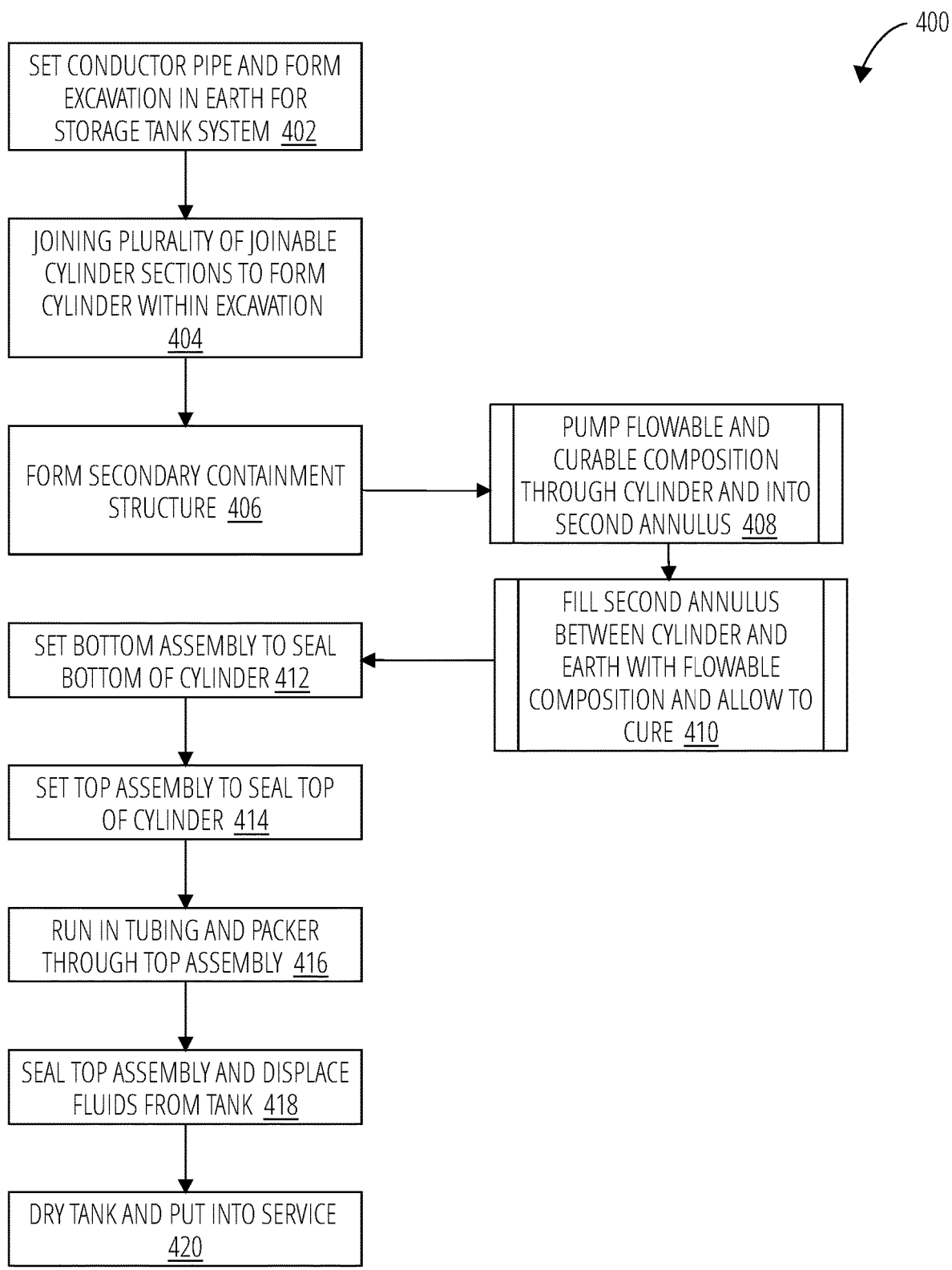
FIG. 4 illustrates a method 400 of storing hydrogen in a subterranean storage system in accordance with one embodiment.

FIG. 4 illustrates a method 400 of storing hydrogen in a subterranean storage system by constructing a storage tank system that is comprised of a conductor pipe a primary containment structure comprised of, a plurality of joinable cylindrical segments configured to form a cylinder, a bottom assembly configured to seal the bottom of the cylinder, and top assembly configured to seal the top of the cylinder. The method 400 involves running or driving the conductor pipe to provide a foundation and preventing the collapse of soil, or other unconsolidated sediments into excavation as it is made. In some configurations, the conductor may include at least one conductor bleed valve, and then forming an excavation in the earth within the conductor pipe to a depth suitable to accommodate a storage tank system (block 402). In some configurations, the process of forming the excavation may involve at least one of rotary drilling, augering, caisson excavation, shaft drilling, pile driving and combinations thereof to a depth sufficient to contain the storage tank system.

In block 404, the method 400 continuously joins the plurality of joinable cylindrical segments to form the cylinder within the excavation. In some configurations, the plurality of joinable cylindrical segments comprises at least one of a threaded connection, bayonet connectors, wedge type connectors, connectors with collars, flange type connectors, and combinations thereof.

In block 406, the method 400 forms the secondary containment structure by pumping a flowable composition into the cylinder (subroutine block 408) at pressure, allowing the flowable composition to flow out the bottom, and up into, and filling a second annulus between the outside of the cylinder and an excavation face to the surface of the earth (subroutine block 410).

In block 412, the method 400 seals the bottom of cylinder with a least one of a shoe, flange, plug, packer, or combination thereof. The method 400 may involve curing the plug and setting at least one packer above the plug.

In block 414, the method 400 attaches the top assembly, containing one or more of second and third annulus valves, tubing valves, tubing gauges, and combinations thereof to the top of the cylinder.

In block 416 the tubing string with packer is set within the cylinder, thereby creating a first annulus between the cylinder and the tubing string. The method 400 may involve setting at least one packer, orifice plate, and/or combination thereof within the top assembly. The method 400 may involve setting at a gauge holder above and adjacent to the bottom assembly.

In block 418, the method 400 completes the top assembly to provide a gas tight seal of the cylinder. After sealing, the method 400 may involve circulating water through the top assembly and into the second annulus to displace fluids used in construction and clean the tank. The method 400 may involve compressing the water in the tank to increase the pressure and verify the ability of the tank to retain fluids at pressure and thereby, verify its integrity.

In block 420, the method 400 may involve circulating nitrogen, or some other dry gas into the tank thru the top assembly to displace the water, dry the tank, and then put it into service for the storage of hydrogen or other gases.

In some configurations, the storage system may include a tertiary containment structure, the tertiary containment structure including at least one of a pipe-in-pipe liner, with either continuous tubing, or a cylinder of made up of joinable cylinder segments, placed within cylindrical tank. The method further comprising 1) filling a third annulus between the cylindrical tank and the pipe-in-pipe liner with a flowable composition that is curable, such as a slurry, a suspension, cement, or other curable substance, and allowing it to harden, 2) flooding the third annulus with an inert gas under pressure, or 3) leaving the third annulus as a void and monitoring it for entry of fugitive hydrogen.

In some configurations, the top assembly includes a top manifold connected to at least one first annulus outlet valve, and may include at least one tubing string service valve, and may include at least one tubing gauge. If a tertiary containment structure is used, the top assembly includes at least one third annular valve (not shown).

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method of storing hydrogen in a subterranean, dual containment storage system, the method comprising:
   forming an excavation in the earth to a depth suitable to accommodate a storage system tank, the storage system tank comprising a primary containment structure and a secondary containment structure, with a monitorable interstitial space between, each constructed of only hydrogen compatible materials, the primary containment structure including:
   a conductor pipe;
   a plurality of joinable cylindrical segments or a plurality of pre-fabricated cylinder sections composed of only the hydrogen compatible materials, configured to form a hydrogen gas-tight cylinder, wherein the hydrogen gas-tight cylinder is joinable to the conductor pipe and the secondary containment structure;
a tubing string composed of only the hydrogen compatible materials and constructed using methods that result in a hydrogen gas-tight tubing string, configured to run inside of the hydrogen gas-tight cylinder to convey hydrogen in and out of the storage system tank and allow for monitoring of an internal pressure of the storage system tank;
a top assembly configured to seal a top of the hydrogen gas-tight cylinder, wherein the top assembly, constructed of only the hydrogen compatible materials, provides for input and withdrawal of hydrogen, provides for monitoring, and provides a first top containment barrier and a second top containment barrier, each top containment barrier including at least one of a plug, a packer, and an orifice plate, wherein a space between the top containment barriers is configured to be monitorable;
a bottom assembly configured to seal a bottom of the hydrogen gas-tight cylinder, wherein the bottom assembly is constructed of only the hydrogen compatible materials, and provides a first bottom containment barrier and a second bottom containment barrier, each bottom containment barrier including at least one of a cap, a flange, a plug, a shoe, and a packer, wherein a space between the bottom containment barriers is configured to be monitorable; and
a tail pipe constructed of only the hydrogen compatible materials, configured to run into a first annulus, between the bottom containment barriers, to allow pressure communication between an interior of the tail pipe and the space between the bottom containment barriers;
assembly of the plurality of joinable cylindrical segments or the plurality of pre-fabricated cylinder sections, including only hydrogen compatible materials, to form the hydrogen gas-tight cylinder substantially impermeable to hydrogen that provides the primary containment of hydrogen;
running the conductor pipe and the hydrogen gas-tight cylinder into the excavation and installing the tubing string and the tail pipe into the hydrogen gas-tight cylinder, thereby creating the first annulus between the hydrogen gas-tight cylinder and the tubing string;
forming the secondary containment structure including:
pumping a flowable composition into the hydrogen gas-tight cylinder, wherein the flowable composition is curable; and
filling a second annulus between the hydrogen gas-tight cylinder and an excavation face with the flowable composition;
allowing the flowable composition to cure, wherein the cured flowable composition is substantially impermeable to gases and non-reactive to hydrogen;
sealing the bottom of the hydrogen gas-tight cylinder with the bottom assembly; and
sealing the top of the hydrogen gas-tight cylinder with the top assembly, thereby resulting in the storage system tank, wherein the resulting subterranean storage system is substantially impermeable to hydrogen and provides a minimum of two containment structures.

2. The method of claim 1, further comprising curing the plug in the bottom assembly and setting at least one packer above the cured plug.

3. The method of claim 1, wherein the plurality of joinable cylindrical segments comprises at least one of a threaded connection, a welded connection, bayonet connectors, wedge type connectors, connectors with collars, flange type connectors, and combinations thereof, such that the connections and connectors are substantially impermeable to hydrogen.

4. The method of claim 1, wherein the storage system tank further comprises a tertiary containment structure, the tertiary containment structure including at least one of a pipe-in-pipe liner, an interior coating, an exterior coating, and combinations thereof, wherein the interior coating and the exterior coating prevent hydrogen permeation, rendering the tertiary containment structure substantially impermeable and non-reactive to hydrogen, thereby providing a minimum of three containment structures.

5. The method of claim 4, wherein the tertiary containment structure includes the pipe-in-pipe liner running through the hydrogen gas-tight cylinder, the method further comprising filling a third annulus between the hydrogen gas-tight cylinder and the pipe-in-pipe liner with the flowable composition.

6. The method of claim 1, wherein the top assembly comprises:
at least one first annulus outlet valve;
at least one tubing string service valve; and
at least one conductor bleed valve.

7. The method of claim 1, wherein forming the excavation includes at least one of rotary drilling, augering, caisson excavation, shaft drilling, and combinations thereof.

8. The method of claim 1, further comprising, after filling the second annulus:
circulating fluids out of the hydrogen gas-tight cylinder;
adding water to the hydrogen gas-tight cylinder;
sealing the top of the hydrogen gas-tight cylinder; and
compressing the water to a test pressure of the storage system tank, thereby assessing a containment integrity of the storage system tank.

9. The method of claim 1, wherein the flowable composition comprises at least one of a slurry, a suspension, a resin, or a cement.

10. The method of claim 1, the assembly of the plurality of joinable cylindrical segments or the plurality of pre-fabricated cylinder sections comprises at least one of:
joining the plurality of pre-fabricated cylinder sections on site, and lowering the joined plurality of pre-fabricated cylinder sections into the excavation for assembling into the hydrogen gas-tight cylinder;
joining the plurality of pre-fabricated cylinder sections to form the hydrogen gas-tight cylinder on site, and lowering the on site formed hydrogen gas-tight cylinder into the excavation;
assembling the plurality of joinable cylindrical segments or the plurality of pre-fabricated cylinder sections off-site to form the hydrogen gas-tight cylinder, and lowering the hydrogen gas-tight cylinder into the excavation.

11. The method of claim 1, further comprising monitoring at least one of pressure and entry of hydrogen in at least one of the second annulus between the hydrogen gas-tight cylinder and the excavation face, the interstitial space between the top containment barriers, and the interstitial space between the bottom containment barriers.

12. The method of claim 1, further comprising, after filling the second annulus:
adding water to the hydrogen gas-tight cylinder; and circulating fluids out of the hydrogen gas-tight cylinder using the tubing string.

13. A subterranean hydrogen storage system comprising:
a primary containment structure constructed of only hydrogen compatible materials, the primary containment structure including:
   a conductor pipe;
   a plurality of joinable cylindrical segments or a plurality of pre-fabricated cylinder sections composed of only the hydrogen compatible materials, configured to form a hydrogen gas-tight cylinder, wherein the hydrogen gas-tight cylinder is joinable to the conductor pipe;
   a tubing string composed of only the hydrogen compatible materials and constructed using methods that result in a hydrogen gas-tight tubing string, configured to run inside of the hydrogen gas-tight cylinder to convey hydrogen in and out of the subterranean hydrogen storage system and allow for monitoring of an internal pressure of the subterranean hydrogen storage system;
   a top assembly constructed of only the hydrogen compatible materials and configured to seal a top of the hydrogen gas-tight cylinder, wherein the top assembly provides for input and withdrawal of hydrogen, monitoring of the storage system, and provides a first top containment barrier and a second top containment barrier, each top containment barrier including at least one of a plug, a packer, and an orifice plate, wherein a space between the top containment barriers is configured to be monitorable;
   a bottom assembly configured to seal a bottom of the hydrogen gas-tight cylinder, wherein the bottom assembly is constructed of only the hydrogen compatible materials, and provides a first bottom containment barrier and a second bottom containment barrier, each bottom containment barrier including at least one of a cap, a flange, a plug, a shoe, and a packer, wherein a space between the bottom containment barriers is configured to be monitorable; and
   a tail pipe constructed of only the hydrogen compatible materials, configured to run into a first annulus, between the bottom containment barriers, to allow pressure communication between an interior of the tail pipe and the space between the bottom containment barriers;
wherein the subterranean hydrogen storage system is substantially impermeable to hydrogen.

14. The subterranean hydrogen storage system of claim 13, further comprising:
a secondary containment structure formed by:
   pumping a flowable composition into the hydrogen gas-tight cylinder, wherein the flowable composition is curable; and
   filling a second annulus between the hydrogen gas-tight cylinder and an excavation face with the flowable composition.

15. The subterranean hydrogen storage system of claim 14, further comprising:
a tertiary containment structure, comprising:
   at least one of a pipe-in-pipe liner run through the hydrogen gas-tight cylinder, an interior coating, an exterior coating, and combinations thereof, wherein the interior coating and the exterior coating prevent hydrogen permeation, rendering the tertiary containment structure substantially impermeable and non-reactive to hydrogen, thereby providing a minimum of three containment structures.

16. The subterranean hydrogen storage system of claim 15, wherein the tertiary containment structure further comprises a tertiary containment layer formed by:
   filling a third annulus between the hydrogen gas-tight cylinder and the pipe-in-pipe liner with the flowable composition.

17. The subterranean hydrogen storage system of claim 14, wherein the flowable composition comprises at least one of a slurry, a suspension, a resin, or a cement.

18. The subterranean hydrogen storage system of claim 13, wherein the bottom assembly further comprises a packer above the plug.

19. The subterranean hydrogen storage system of claim 13, wherein the plurality of joinable cylindrical segments comprises at least one of a threaded connection, a welded connection, bayonet connectors, wedge type connectors, flanged connections, connectors with collars, and combinations thereof such that the connections and connectors are hydrogen gas tight and substantially impermeable to hydrogen.

20. The subterranean hydrogen storage system of claim 13, wherein the top assembly comprises:
   at least one first annulus outlet valve;
   at least one tubing string service valve; and
   at least one conductor bleed valve.

\* \* \* \* \*